US010311598B2

(12) United States Patent
Rodriguez et al.

(10) Patent No.: US 10,311,598 B2
(45) Date of Patent: Jun. 4, 2019

(54) FULLY AUTOMATED LOCALIZATION OF ELECTROENCEPHALOGRAPHY (EEG) ELECTRODES

(71) Applicant: THE REGENTS OF THE UNIVERSITY OF CALIFORNIA, Oakland, CA (US)

(72) Inventors: Cameron Rodriguez, Santa Monica, CA (US); Mark Cohen, Calabasas, CA (US)

(73) Assignee: THE REGENTS OF THE UNIVERSITY OF CALIFORNIA, Oakland ( * ) Notice: Subject to any disclaimer, the term of this patent is extended or adjusted under 35 U.S.C. 154(b) by 370 days.

(21) Appl. No.: 14/280,537

(22) Filed: May 16, 2014

(65) Prior Publication Data
US 2014/0341456 A1 Nov. 20, 2014

Related U.S. Application Data

(60) Provisional application No. 61/824,250, filed on May 16, 2013.

(51) Int. Cl.
*G06T 15/08* (2011.01)
*G06T 7/73* (2017.01)

(52) U.S. Cl.
CPC ............ *G06T 7/74* (2017.01); *G06T 15/08* (2013.01); *G06T 2200/04* (2013.01); *G06T 2207/10088* (2013.01); *G06T 2207/30016* (2013.01)

(58) Field of Classification Search
CPC ..... A61B 5/0476; A61B 5/4094; A61B 5/055; A61B 2018/00839; A61B 5/4839;
(Continued)

(56) References Cited

U.S. PATENT DOCUMENTS 4,736,751 A 4/1988 Gevins et al.
5,044,368 A * 9/1991 Putz .................... A61B 5/04001
600/377
(Continued)

FOREIGN PATENT DOCUMENTS

WO 2013/026749 A1 2/2013

OTHER PUBLICATIONS

Freestone et al., Electrical probing of cortical excitability in patients with epilepsy, Dec. 2011 [retrieved Aug. 12, 2016], Epilepsy & Behaviour: The Future o Automated Seizure Detection and Prediction, vol. 22, Suppl 1, pp. S110-S118. Retrieved from the Internet: http://www.sciencedirect.com/science/article/pii/S1525505011005129.*

(Continued)

*Primary Examiner* — Andrew M Moyer
*Assistant Examiner* — Dennis Rosario
(74) *Attorney, Agent, or Firm* — O'Banion & Ritchey LLP; John P. O'Banion

(57) ABSTRACT

A method for fully automated localization and channel identification of electroencephalography (EEG) electrodes. The electrode locations are automatically identified from three dimensional images stored in an electronic format, wherein the images may be derived from magnetic resonance imaging (MRI) that render the electrodes visible and object shapes and properties are used to locate the electrodes in the three dimensional images. The three dimensional images also show the brain in detail, such that the relationship of the electrodes to the brain is available, thereby making it possible to better identify electrical sources within the brain that create the EEG signals.

10 Claims, 16 Drawing Sheets

(58) Field of Classification Search
CPC ... A61B 5/0492; A61B 5/0478; A61B 5/6882; A61B 5/0215; A61B 5/726; A61B 5/0006; A61B 2090/374; A61N 1/36064; A61N 2001/086; A61N 1/36082; A61N 1/36025; A61N 1/0529; A61N 1/0551; A61N 1/0531; A61N 1/0534; A61N 1/36185; A61N 1/37247; A61N 1/086; A61N 1/3718; A61N 1/05; G06T 7/11; G06T 7/0012; G06T 2210/41; G06T 15/08; G06K 9/3241; G06F 3/015; G06F 19/3406; G01R 33/286

See application file for complete search history.

(56) References Cited

U.S. PATENT DOCUMENTS

| | | | |
|---|---|---|---|
| 5,263,488 | A | 11/1993 | Van Veen et al. |
| 5,568,816 | A | 10/1996 | Gevins et al. |
| 5,813,404 | A * | 9/1998 | Devlin ............ A61B 5/0416 600/372 |
| 8,520,892 | B2 * | 8/2013 | Kuleschow ............ G06T 7/136 382/103 |
| 8,538,523 | B2 * | 9/2013 | Sommer ............ A61N 1/056 607/15 |
| 8,538,537 | B2 * | 9/2013 | Hulvershorn ...... A61N 1/36082 607/45 |
| 8,862,240 | B2 * | 10/2014 | Goetz ............ A61N 1/0551 607/30 |
| 9,042,958 | B2 * | 5/2015 | Karmarkar ......... A61B 5/0476 600/411 |
| 2009/0306746 | A1 * | 12/2009 | Blischak ............ A61N 1/37235 607/59 |
| 2011/0222787 | A1 * | 9/2011 | Thiemert .......... G06F 17/30802 382/225 |
| 2012/0271151 | A1 | 10/2012 | Lavoilette et al. |
| 2015/0313497 | A1 * | 11/2015 | Chang .................. A61B 5/048 600/544 |

OTHER PUBLICATIONS

Dalai et al., Localization of neurosurgically implanted electrodes via photograph-MR-radiograph coregistration, Sep. 2008 [retrieved Aug. 12, 2016], Journal of Neuroscience Methods, vol. 174, Issue 1, pp. 106-115. Retrieved from the Internet: http://www.sciencedirect.com/science/article/pii/S0165027008003762.*

Sijbers et al., Automatic Localization of EEG electrode markers within 3D MR data, May 2000 [retrieved Aug. 12, 2016], Magnetic Resonance Imaging, vol. 18, Issue 4, pp. 485-488. Retrieved from the Internet: http://www.sciencedirect.com/science/article/pii/S0730725X00001211.*

Noirhomme et al., Registration and Real-Time Visualization of Transcranial Magnetic Stimulation with 3-D MR Images, Oct. 18, 2004 [retrieved Feb. 13, 2017], IEEE Transactions on Biomedical Engineering, vol. 51, Issue: 11, pp. 1994-2005. Retrieved from the Internet: http://ieeexplore.ieee.org/abstract/document/1344202/.*

Sebastiano et al., A rapid and reliable procedure to localize subdural electrodes in presurgical evaluation of patients with drug-resistant focal epilepsy, Feb. 2006 [retrieved Dec. 5, 2017], Clinical Neurophysiology, vol. 117, Issue: 2, pp. 341-347. Retrieved from the Internet: http://www.sciencedirect.com/science/article/pii/S1388245705004153.*

Yoo et al., 3D Localization of surface 10-20 EEG electrodes on high reslolution anatomical MR images, Apr. 1997 [retrieved Dec. 5, 2017], Electroencephalography and Clinical Neurophysiology, vol. 102, Issue 4, pp. 335-339. Retrieved from the Internet: http://www.sciencedirect.com/science/article/pii/S0013469496950889.*

Lamm et al., Co-Registration of EEG and MRI Data Using Matching of Spline Interpolated and MRI-Segmented Reconstructions of the Scalp Surface, Dec. 2001 [retrieved Jun. 9, 2018], Brain Topography, vol. 14, Issue 2,pp. 93-100. Retrieved from the Internet: https://link.springer.com/article/10.1023/A:1012988728672.*

Pozdin, Automated Extraction of Subdural Grid Electrodes from Post-Implant MRI Scans for Epilepsy Surgery [thesis online], May 13, 2004 [retrieved Dec. 16, 2018], 61 total pages. Retrieved from the Internet<URL:https://smartech.gatech.edu/handle/1853/4979><URI:http://hdl.handle.net/1853/4979> (Year: 2004).*

ISA/US, United States Patent and Trademark Office (USPTO), related PCT International Application No. PCT/US2014/03850, International Search Report and Written opinion dated Oct. 7, 2014, pp. 1-5, International Preliminary Report on Patentability dated Nov. 17, 2015, pp. 6-9, claims searched and examined, pp. 10-11.

* cited by examiner

FULLY AUTOMATED LOCALIZATION OF ELECTROENCEPHALOGRAPHY (EEG) ELECTRODES

RELATED APPLICATIONS

This application claims priority to U.S. Provisional Patent Application No. 61/824,250, entitled "Fully Automated Localization Of Electroencephalography (EEG) Electrodes," filed May 16, 2013.

STATEMENT AS TO RIGHTS TO INVENTIONS MADE UNDER FEDERALLY SPONSORED RESEARCH AND DEVELOPMENT

This invention was made with government support under: DA022768, DA026109, awarded by the National Institutes of Health. The Government has certain rights in the invention.

BACKGROUND OF THE DISCLOSURE

1. Field of the Disclosure

Aspects of the disclosure are related to electroencephalography (EEG), and more specifically, to a method and system for fully automated localization of electroencephalography electrodes.

2. Description of the Related Art

Commonly referred to as "EEG," electroencephalography is used both clinically and in research applications. The measurements that it makes on the scalp arise from sources deep in the brain, but determination of those source locations is difficult, and is limited significantly by indeterminacy of the electrode locations both with respect to each other and to the brain.

For the most part, the methods in use for localizing scalp electrodes are crude. Simple landmarks, such as the ears, the midline, the nasion (a notch above our nose), are used in placing the electrodes, but after applying the electrodes themselves there is still considerable variability. Most importantly, the relationship of these phrenological features of the head is related only loosely to the location of the electrodes with respect to the brain.

There are a variety of methods that attempt to improve electrode localization. For example, Polhemus (http://www.polhemus.com) makes a digitizing wand with which the user can essentially point to each electrode and have its location digitized with respect to other features of the head, typically the same points used in the fully manual approach. Another commercial device, the Electrical Geodesics, Inc. (http://www.egi.com) Geodesic Photogrammetry System, uses an array of cameras whose location is well known. With this system a user can point to each electrode in the pictures on a computer screen thereby identifying its location. These methods are relatively precise, but extremely tedious. Their principal value is that the electrodes are better localized relative to scalp features, but they make no direct reference to the brain. Further, they do not account for the common problem that electrode locations shift when a patient changes position (e.g., lies down on a bed). Nevertheless, such systems command high prices in the market.

There have also been attempts to determine electrode location from magnetic resonance imaging (MRI). Those methods relied on image intensity and located exogenous markers attached to each electrode, such as vitamin A or E capsule rather than the electrodes themselves. These image-guided approaches to date were performed on relatively sparse (~32 electrode) arrays compared to the dense (128+ electrode) arrays currently available. In high-density arrays image distortions due to variations in magnetic susceptibility, and signal losses, are inevitable from the high electrode count and their respective wiring.

SUMMARY

The present disclosure discloses a method for fully automated localization of electroencephalography (EEG) electrodes. The electrode locations are identified automatically from three dimensional images stored in an electronic format, wherein the images are derived from magnetic resonance imaging (MRI) that render the electrodes visible and object shapes and properties are used to locate the electrodes in the three dimensional images. The three dimensional images also show the brain in detail, such that the relationship of the electrodes to the brain is available, thereby making it possible to identify electrical sources within the brain that create the EEG signals.

DETAILED DESCRIPTION

Figure 1:
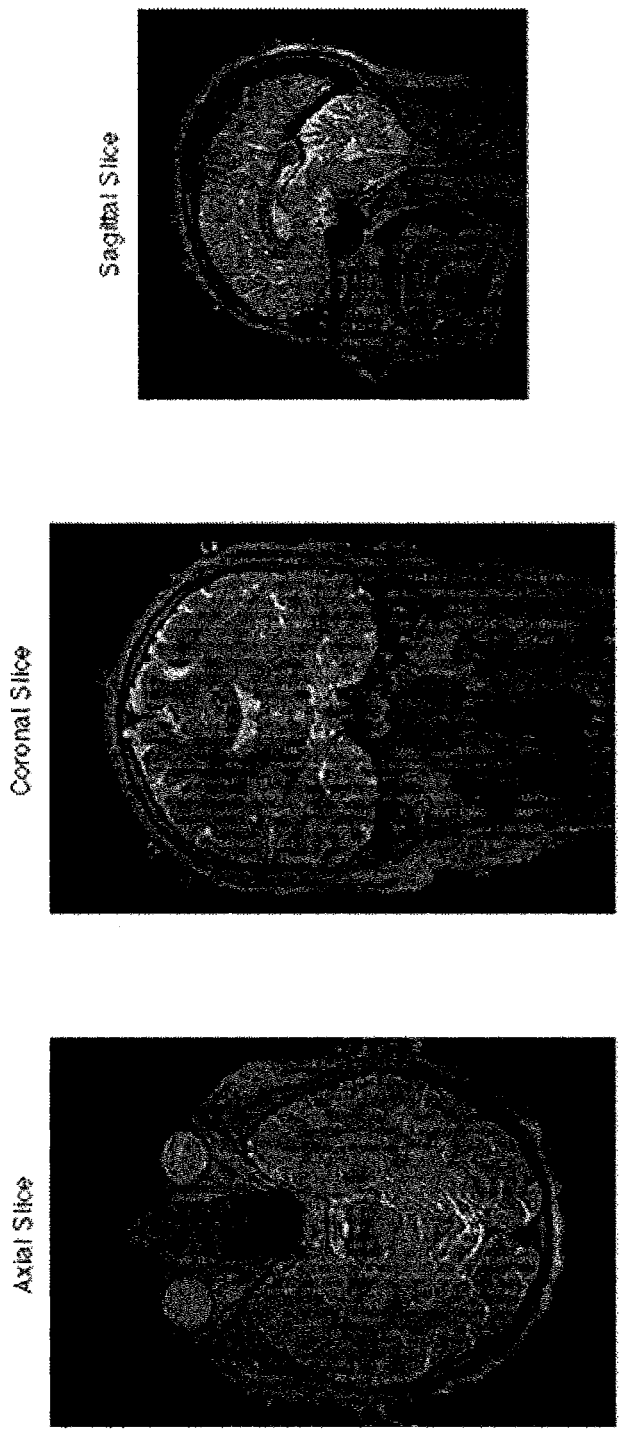
FIG. 1 comprises mid-axial, mid-coronal and mid-sagittal images with background noise removed, wherein in each of the images portions of the electrodes are visible on the surface of the head.

One aspect of the disclosure includes methods and a system of precisely identifying the electrode locations from medical images, and to do so without tedious manual work.

Furthermore, embodiments have many general applications beyond the focus here in EEG, as it provides a generalizable method for identifying the locations of objects of approximately known shape from three dimensional imagery. Example applications might include identification of underwater objects (e.g., submarines) from ultrasonography, or detection of body parts from computer-controlled detectors (such as the Microsoft "Kinect").

In this disclosure, the location of the electrodes is identified automatically from three dimensional images. In a one embodiment, the images are derived from magnetic resonance imaging (MRI) using carefully chosen operating parameters that render the electrodes visible. Using the computer-implemented methods of the present disclosure, the exact electrode locations can be measured in the space of just a few minutes. With computer optimization, this time likely can be reduced a few seconds.

When MRI is used to collect the images, the pictures also show the brain in precise detail, and the relationship of the electrodes to the brain is available immediately. With this, it will be possible to more precisely identify the electrical sources within the brain that create the EEG signals. The clinical applications include, for example, localization of the onset sites of epileptic seizures, as well as many other electrical sources of clinical interest, and the research implications include the localization of functional systems in the brain that respond to stimuli and/or that control behavior, including sleep.

In the following description of the embodiments, reference is made to the accompanying drawings which form a part hereof, and in which is shown by way of illustration a specific embodiment in which the disclosure may be practiced. It is to be understood that other embodiments may be utilized and structural changes may be made without departing from the scope of the present disclosure.

Described below in detail is an example using MRI as the brain imaging modality. However, the principal components of the computational method are not specific to MRI. Thus, with minor modifications, the disclosure can be applied to X-Ray computed tomography, 3-dimensional tomography, and likely to future imaging technologies. Digitized 3-dimensional scalp measurements, such as laser measurements (e.g., the Cyberware PS scanner—http://www.cyberware.com/) also provide suitable input data.

The identification of objects, such as electrodes, in magnetic resonance images is made difficult by the fact that their presence causes distortion (artifacts) in the image acquisition. The artifacts arise principally for two reasons: (1) near, and at, the interface of materials with different magnetic susceptibilities ($\chi$) distortions in the main magnetic field (B0) occur; and (2) there is parasitic signal loss in what is known as the B1 or radio frequency (RF) field at and near these objects.

For the first issue involving B0 field distortions, the wires connecting the electrodes to the amplifiers and the electrodes themselves have quite different $\chi$ than the tissue with which they are in contact. The $\chi$ differences leads to a distortion in B0 at and near these object, which, in turn, leads to an attenuation of signal (darkening of the image) from these points and can lead to small positional distortion. As for the second issue of losses in B1 field, the electrodes and wires are constructed from materials (metal and other conductive substances) that can draw RF energy from the B1 field and, as a result, leads to an attenuation of signal at and near these points. Adding to the difficulties already imposed by these artifacts is the fact that the distribution from the electrodes and the wires that connect them is not uniform across the head or from subject to subject or from session to session leading to non-uniform intensities between the electrodes themselves. The method that is the subject of this disclosure is robust against the above-mentioned artifacts in that it primarily relies on object shape and properties of it to locate the electrodes rather than intensity differences (contrast).

The computer-implemented method of this disclosure operates on MRI scans that make the electrodes themselves visible. In one example, water-filled electrodes manufactured as part of the EEG product sold by Electrical Geodesics, Inc. are used. Effective imaging sequences for this purpose include a large variety of heavily T2-weighted scans. However, the imaging methods (and electrodes) can be adapted to encompass a broad variety of electrodes and of MRI scan types.

The following methods can be performed using one of the many public domain programming languages, e.g. C, Fortran, MATLAB, Octave, and the like.

Figure 16:
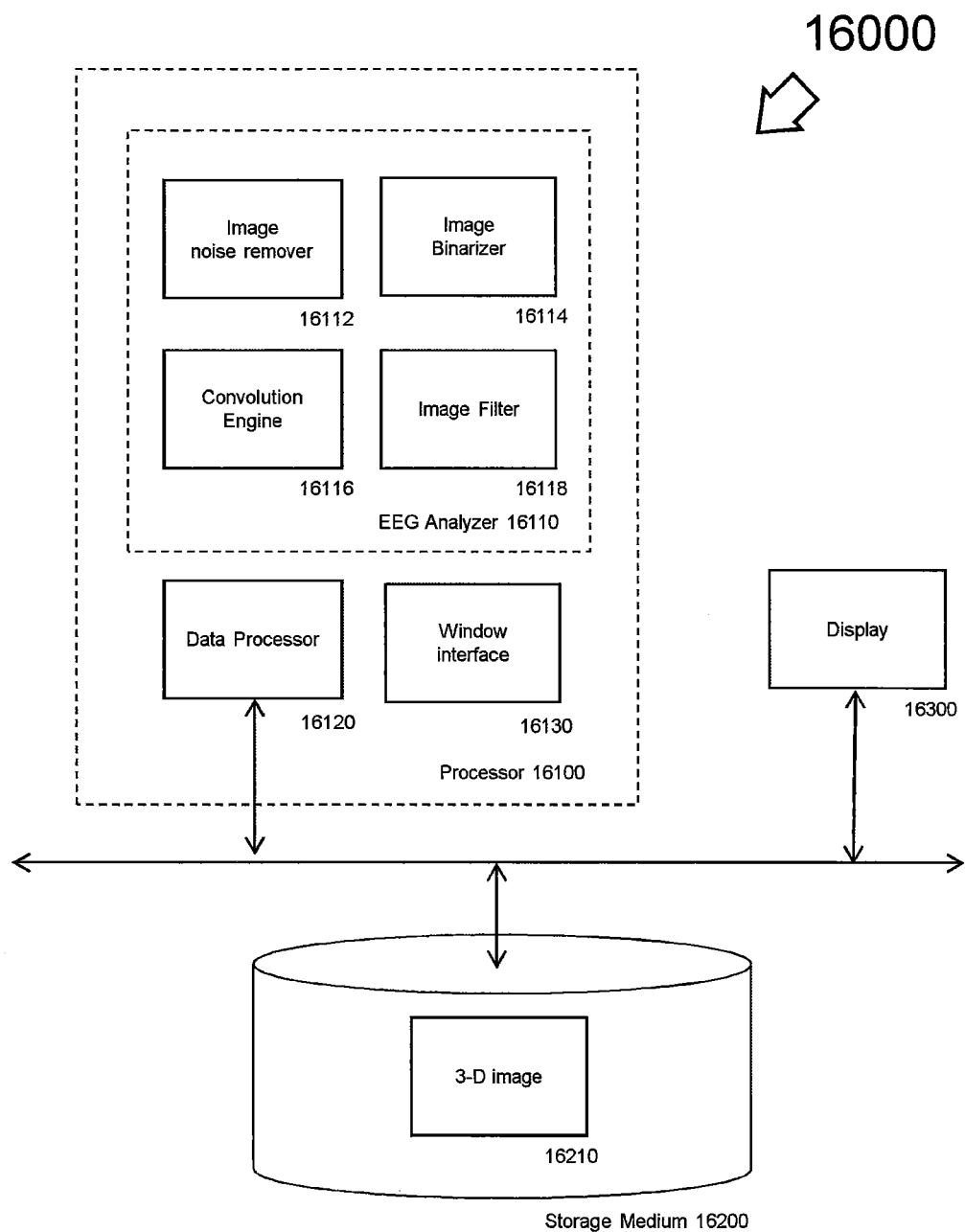
FIG. 16 illustrates a block diagram of a device embodiment.

The methods may utilize a computing system as seen in FIG. 16, constructed and operative in accordance with an embodiment of the present disclosure. System 16000 may run a multi-tasking operating system (OS) and include at least one processor or central processing unit (CPU) 16100, a non-transitory computer-readable storage medium 16200, and a display 16300.

Processor 16100 may be any central processing unit, microprocessor, micro-controller, computational device or circuit known in the art. It is understood that processor 16100 may communicate with and temporarily store information in Random Access Memory (RAM) (not shown).

As shown in FIG. 16, processor 16100 is functionally comprised of a EEG analyzer 16110, a window interface 16130, and a data processor 16120.

EEG analyzer 16110 may further comprise: an image noise remover 16112, image binarizer 16114, convolution engine 16116, and an image filter 16118.

Image noise remover 16112 is any structure that enables the EEG analyzer 16110 to remove noise from an image.

Image binarizer 16114 is any structure or component capable of creating a binary image.

Convolution engine 16116 is any structure configured to convolve images.

Image filter 16118 is a structure that removes artifacts from images.

Window interface 16130 may be any window-driven user interface known in the art.

Data processor 16120 enables processor 16100 to interface with storage medium 16200, display 16300 or any other component not on the processor 16100. The data processor 16120 enables processor 16100 to locate data on, read data from, and write data to these components.

These structures may be implemented as hardware, firmware, or software encoded on a computer readable medium, such as storage medium 16200. Further details of these components are described with their relation to method embodiments below.

Display 16300 may be any optical display device known in the art, including, but not limited to: cathode ray tubes (CRT), liquid crystal displays (LCD), light emitting diode (LED) or other display known in the art.

Computer-readable storage medium 16200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage medium 16200 may be remotely located from processor 16100, and be connected to processor 16100 via a network such as a local area network (LAN), a wide area network (WAN), or the Internet.

In addition, as shown in FIG. 16, storage medium 16200 may also store 3-D images 16210.

Figure 2:
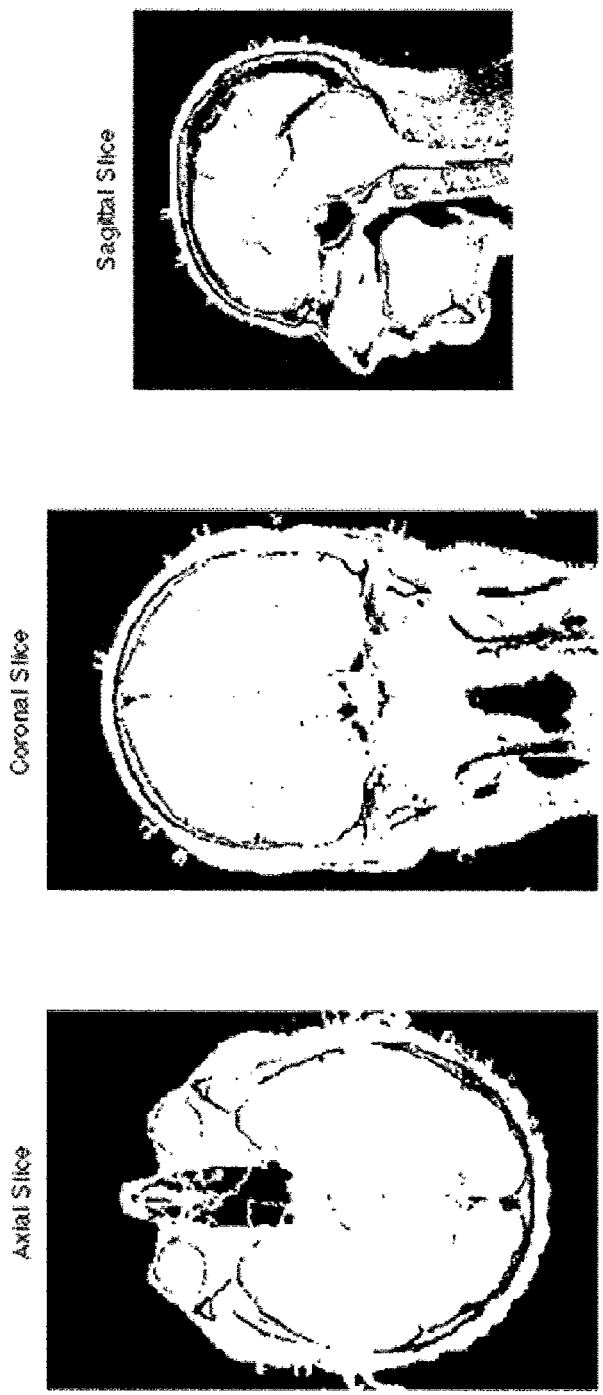
FIG. 2 comprises mid-axial, mid-coronal and mid-sagittal Masks, wherein these masks are the binarized versions of the images in FIG. 1.

In the first stage of the location and extraction process (LocEx), the areas where signal is due solely to background noise are removed (intensity values nulled) with an image noise remover 16112. See FIG. 1. To find an estimate for the background values, the standard deviation of the image intensities for the mid-sagittal slice is used. Next, the image is binarized with an image binarizer 16114, which means that all non-zero values in the image are set to one. See FIG. 2. From this binary image, spurious discrete volumes and low connectivity areas are also removed with an image filter 16118. Low connectivity is defined at this point as voxels with three or fewer adjacent non-zero voxels as an aid to the subsequent processing. Next, spurious discrete volumes are removed by finding all the discrete volumes by bounding boxes, the smallest of which are removed.

Figure 3:
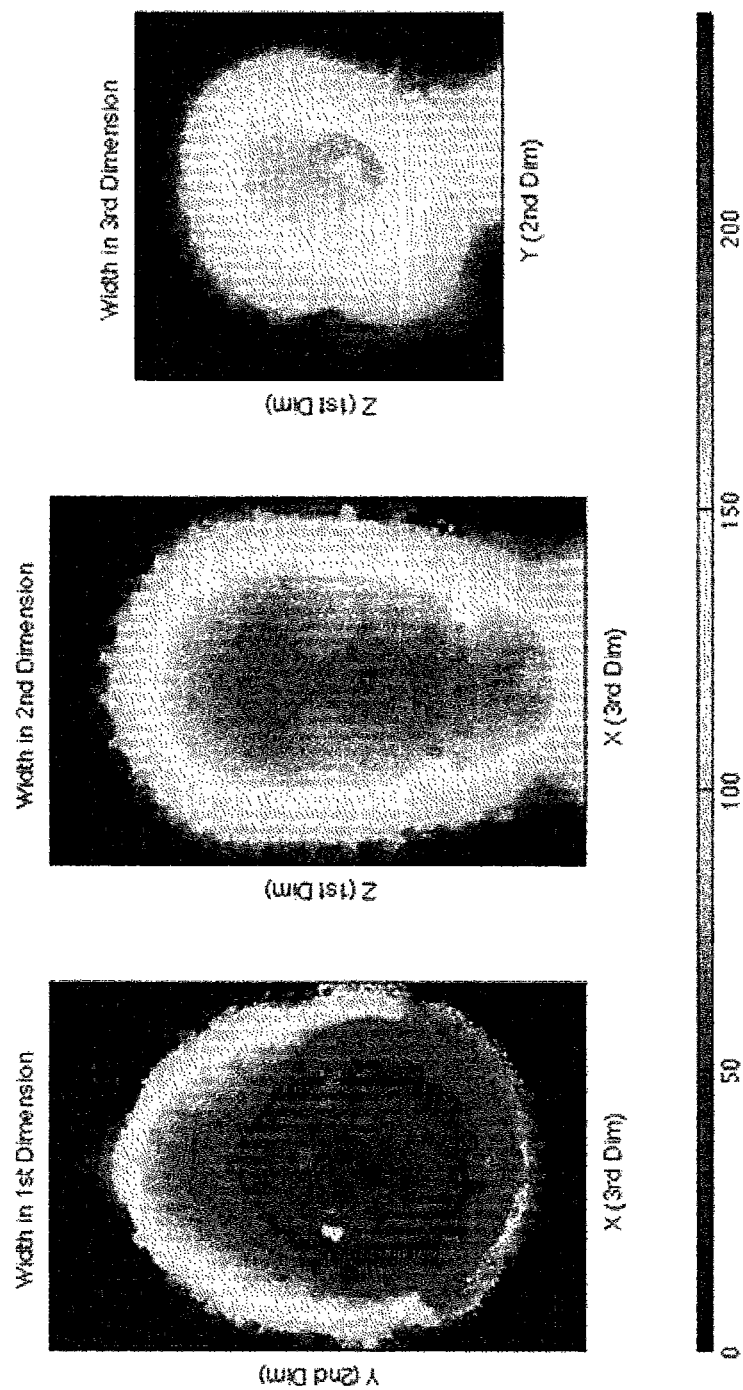
FIG. 3 comprises three measurements of widths in various dimensions (axial, sagittal and coronal).

From the binary image, a head mask is created to constrain all detected electrodes. In addition to the mask, the surface of the binary image is extracted creating a shell. From this, shell measurements of the widths along the direction of the indices of the image are made. See FIG. 3. These widths may vary due to the exact orientation of the acquisition but for the most part are anterior to posterior (AP), left to right side (LR), and rostral to posterior (RC).

Figure 4:
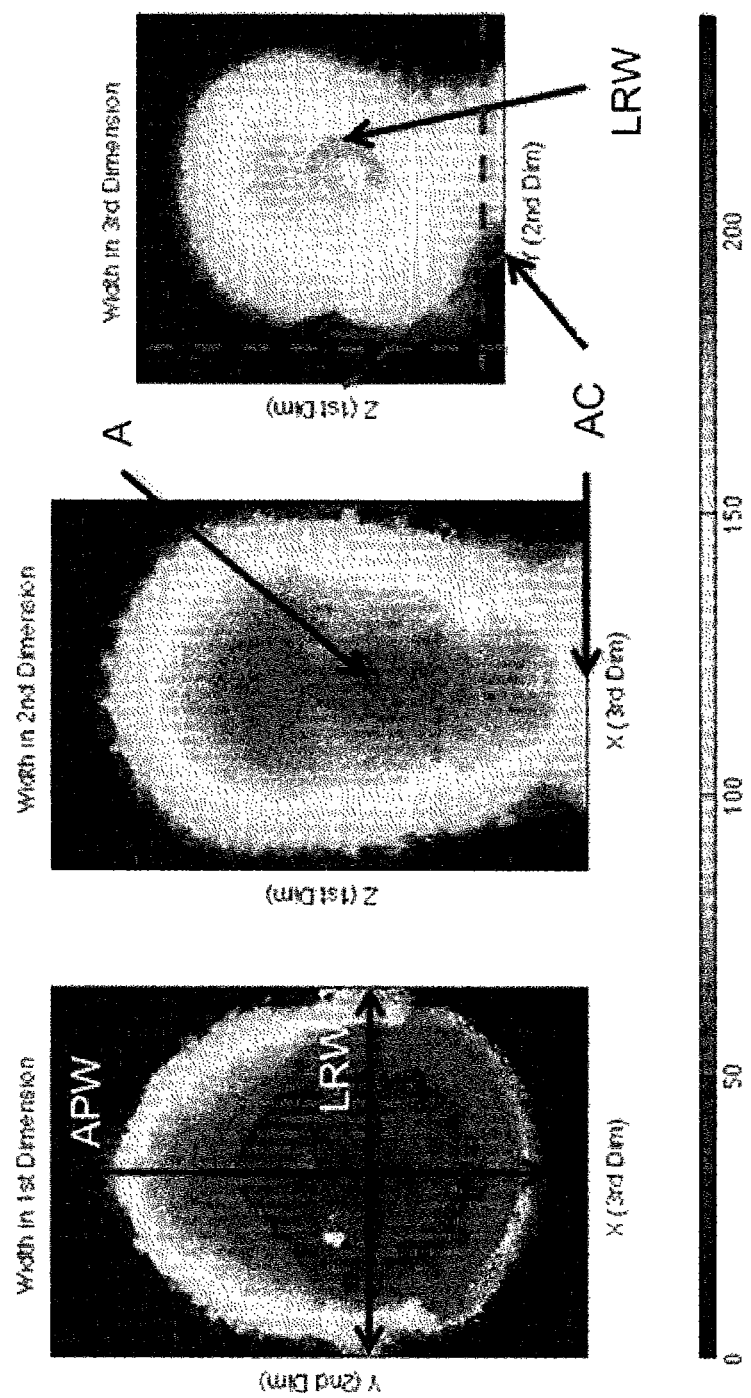
FIG. 4 comprises three Extraction Landmarks: Anterior-Posterior Width (APW), Left-Right Width (LRW), Anterior Most Point (A), Anterior Most Posterior Point (AC), wherein the dashed lines represent the boundaries from which the neck nose and chin trimming will be performed.
Figure 5:
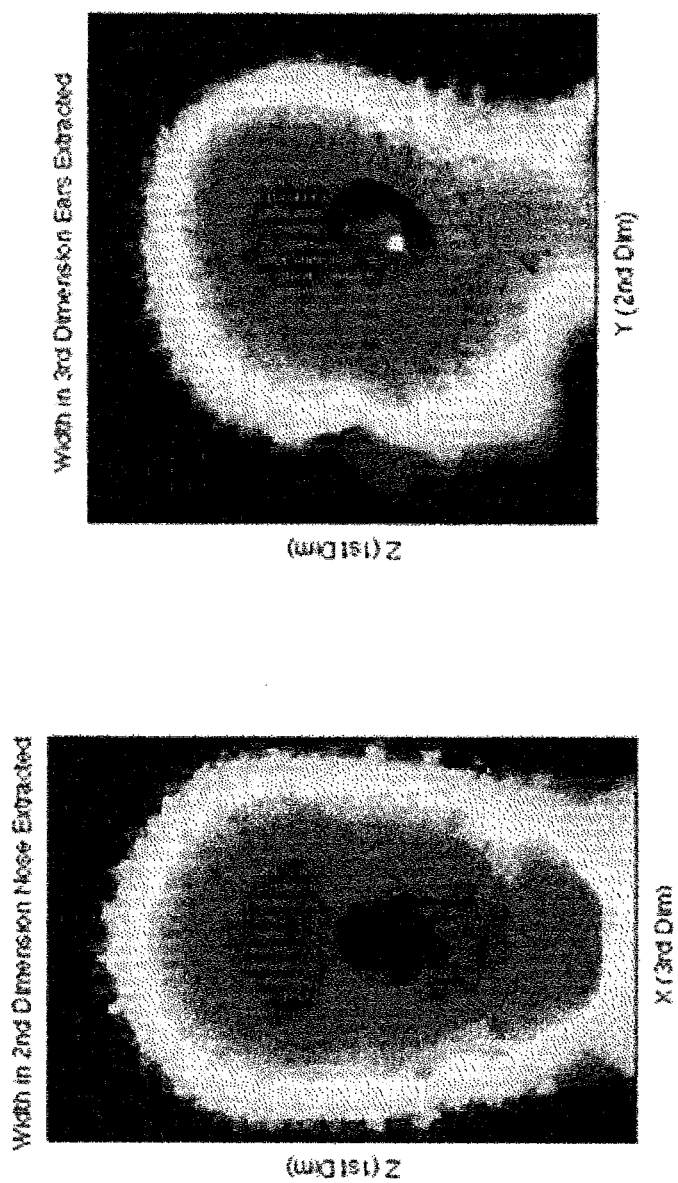
FIG. 5 comprises two images of widths with the nose and ears extracted.
Figure 6:
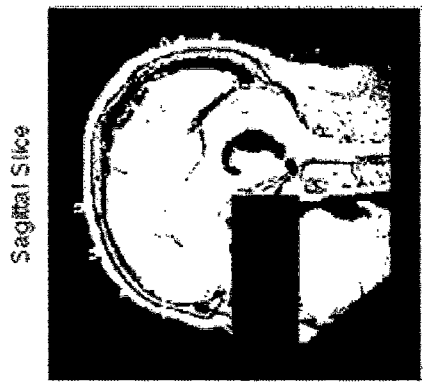
FIG. 6 comprises mid-axial, mid-coronal and mid-sagittal masks after the trimming was performed for the nose, ears, chin/mouth, and neck.
Figure 6:
Figure 6:
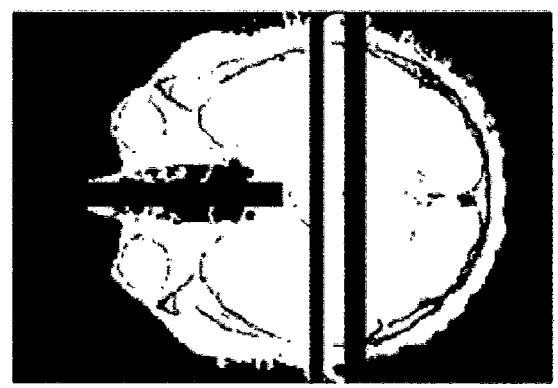

Using the measured widths and the properties of the head shell image, the orientation of the head may be determined. These steps may be omitted in cases where the head orientation is known already from labeling of the original scanned data. The location of the neck, chin, nose and ears are determined, all of which are removed from both the mask and shell. See FIGS. 4-6. The posterior side is determined by finding the side of the image where the largest area is filled, which corresponds to the neck. Next, finding the zone on the side where the neck exists that has the largest filled area provides the posterior side of the image. The ears are determined by finding the widest point in the only remaining direction, the LR direction. The anterior 2 centimeters of the shell and mask are removed to eliminate the nose. The widest points from LR are removed to eliminate the ears. The neck is removed by finding the point at which the AP width becomes larger than the AP width at its most posterior measured position by 4 centimeters. Everything posterior to this point is then removed. If no point exists 1.5 cm anterior to the neck point, the neck is assumed to not be in the picture and no neck trimming is performed. Finally, the chin and mouth are eliminated by removing everything in front of a plane running parallel to LR and connecting the most anterior position of the nose with the most anterior point on the most posterior part of the image.

Figure 7:
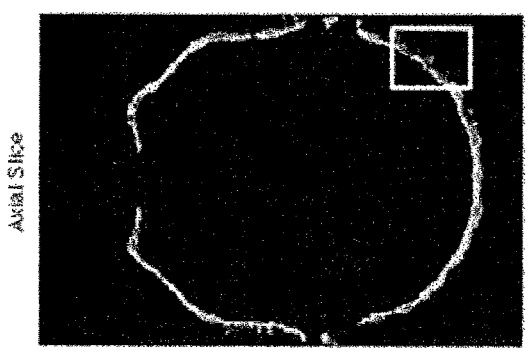
FIG. 7 comprises six images, wherein the three images in the top row are of the filtered outline in the mid-axial, mid-coronal and mid-sagittal views, and the white rectangles represent the zoom locations in the respective bottom row images. Note the color differences, wherein the hotter colors represent areas of higher intensity.
Figure 7:
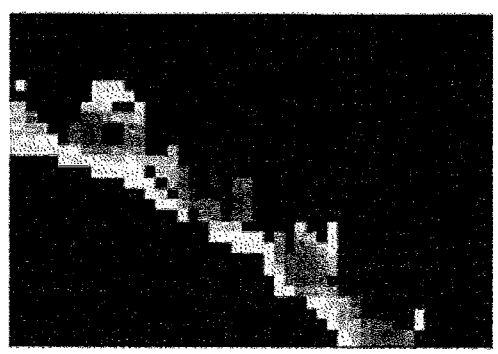
Figure 7:
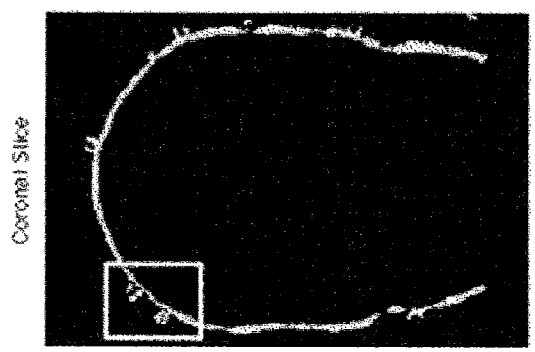
Figure 7:
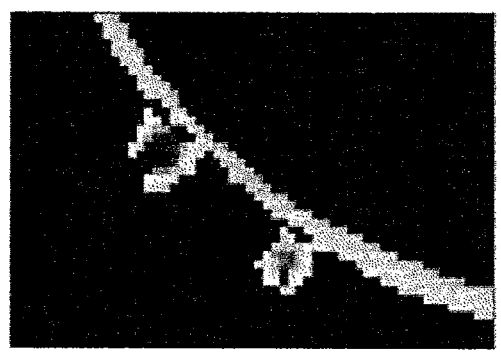
Figure 7:
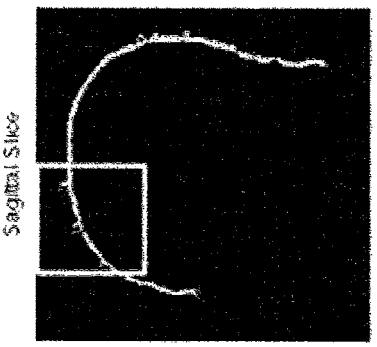
Figure 7:
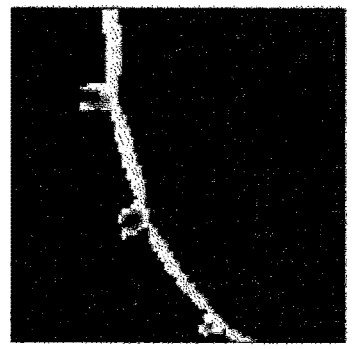
Figure 14:
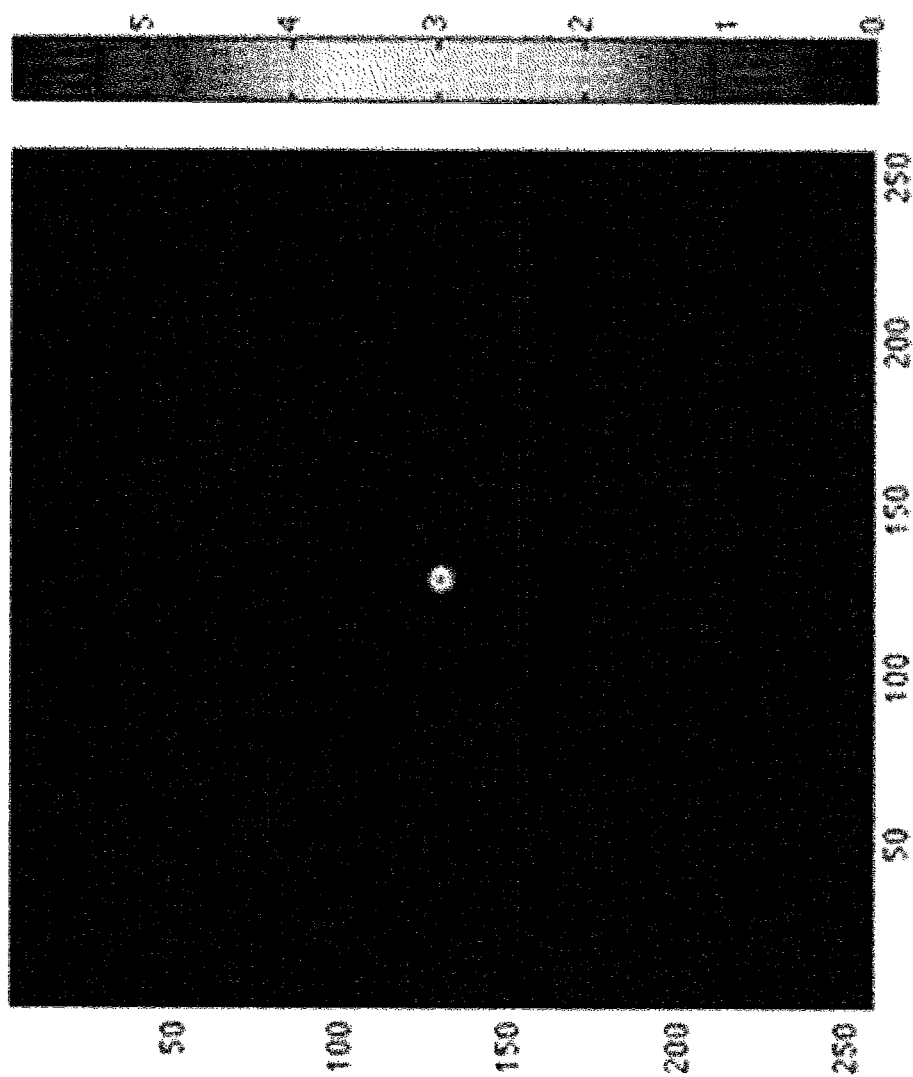
FIG. 14 is an example image of an electrode mask.

Once the image has been trimmed, the LocEx is performed. A three dimensional mask that is matched to a three dimensional rotation of one electrode is then convolved with the surface shell creating a filtered shell using a convolution engine 16116. The convolution operation may be performed on the Fourier transform of the 3D images, which results in very large speed improvements (see FIG. 14). The filtered shell is then constrained by the head mask where values outside of the region of the head mask are removed (FIG. 7). The filtering leads to non-uniform distribution in intensities such that surfaces from the scalp can be separated from surfaces from the electrodes by applying a threshold the filtered shell intensities. First, all values below the mean value are removed. The mean and standard deviation are then calculated again and their combination is used for the threshold value. As noted, intensities from the raw image are not used due to their non-uniformity. In this case, however, the intensities that have had a threshold applied to them result from differences in shape rather than the intensities of the original image.

Figure 8:
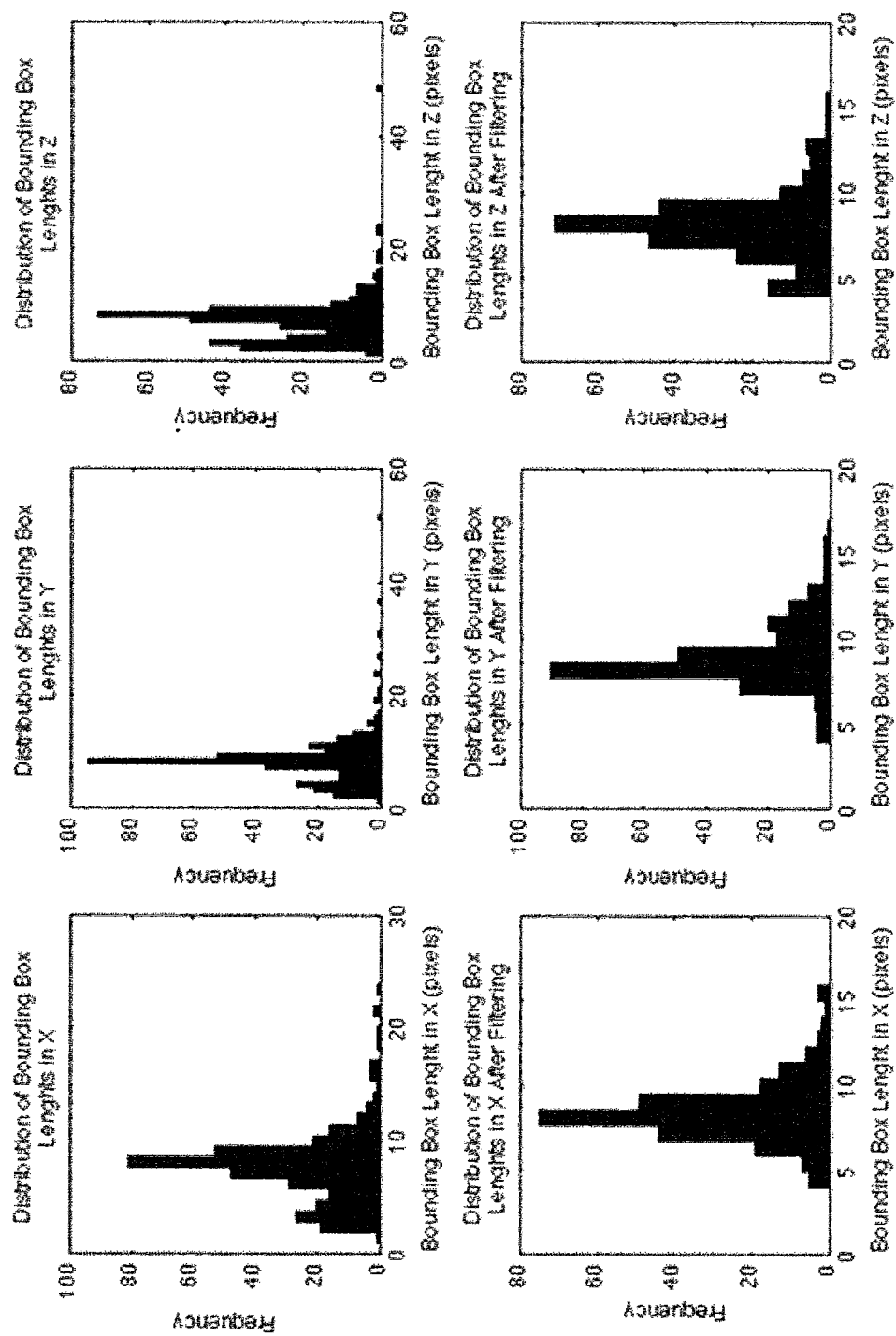
FIG. 8 comprises eight graphs showing bounding box edge length distributions before and after filtering.

Final cleaning is done on the thresholded filtered shell (TFS): all discrete objects in the TFS that cannot be bounded by a cube approximately matching the size of one electrode are removed. See FIG. 8.

Figure 9:
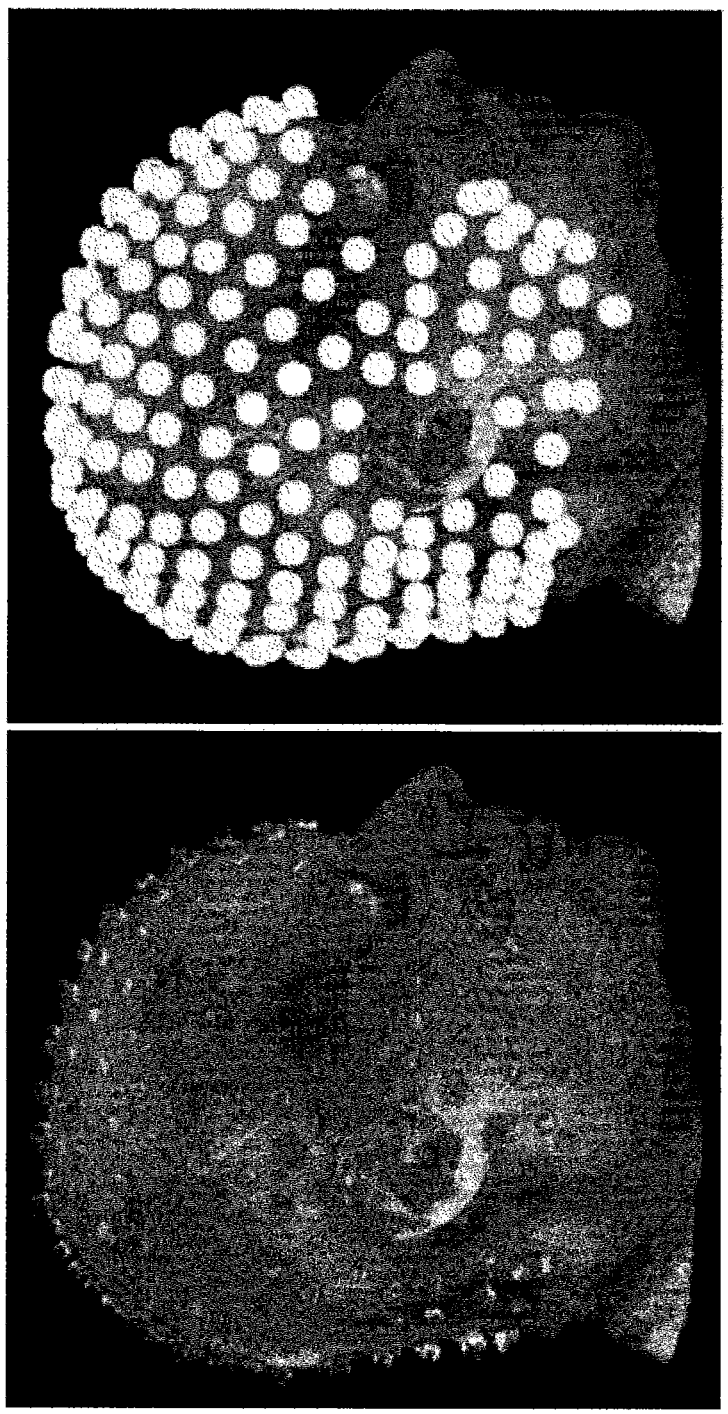
FIG. 9 comprises two images, wherein the left image is an initial image, and the right image is the initial image with white spheres placed at the determined electrode locations.
Figure 10:
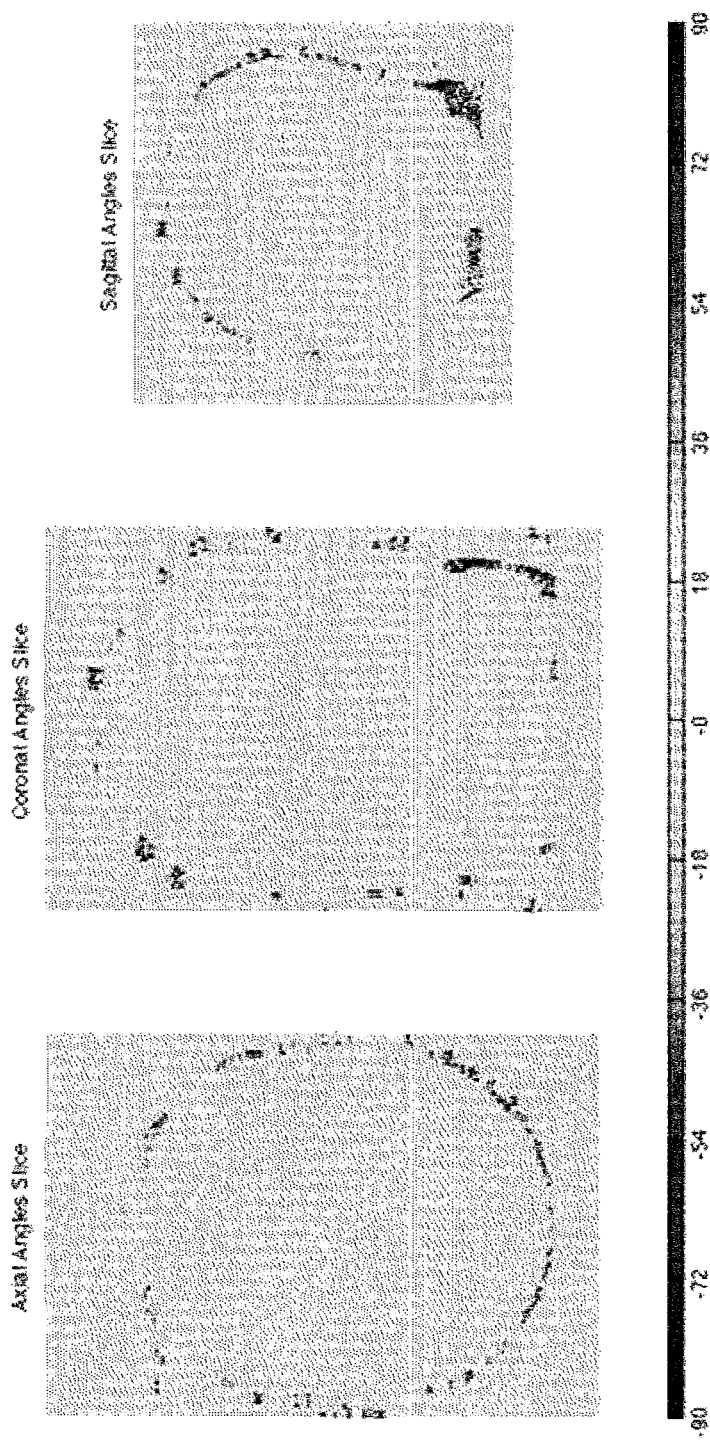
FIG. 10 comprises mid-axial, mid-coronal and mid-sagittal images of the edge angles of the filtered shell.
Figure 11:
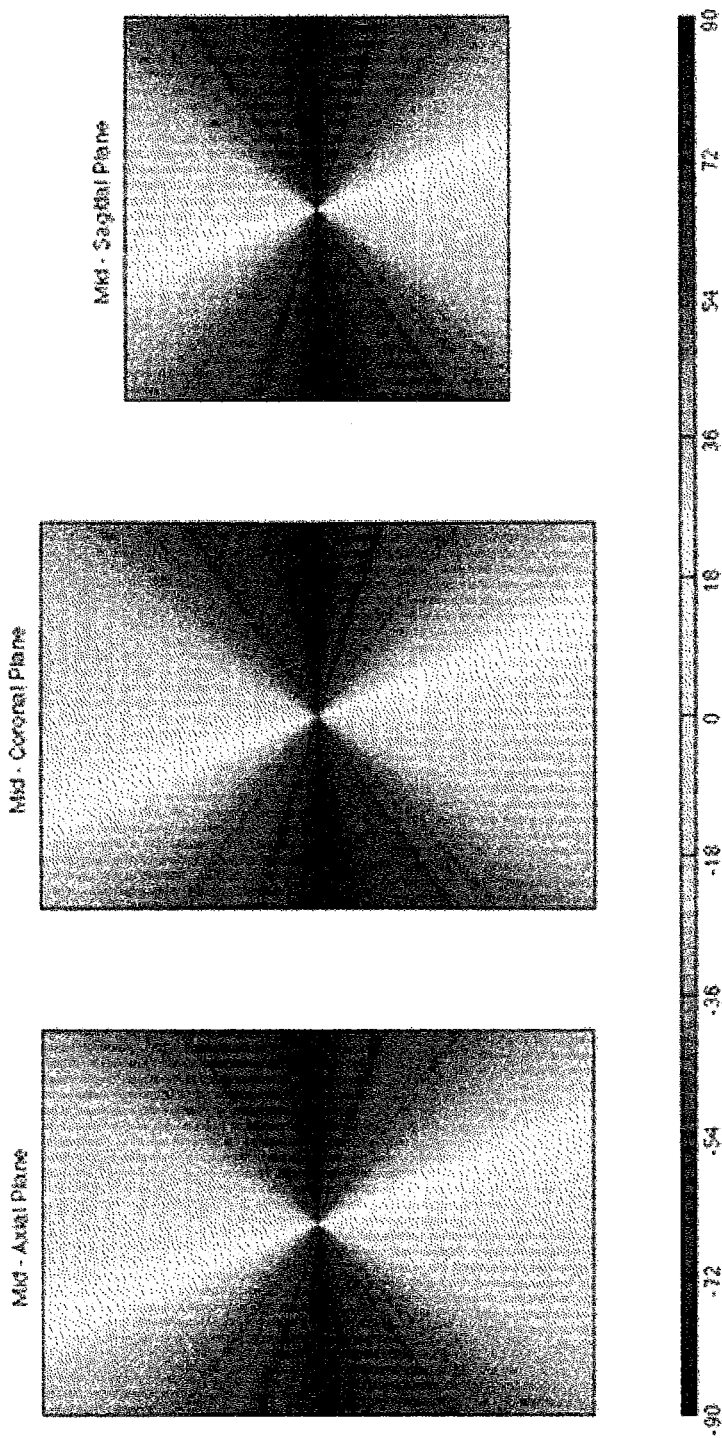
FIG. 11 comprises three examples of Generated Radial Angle Maps.
Figure 12:
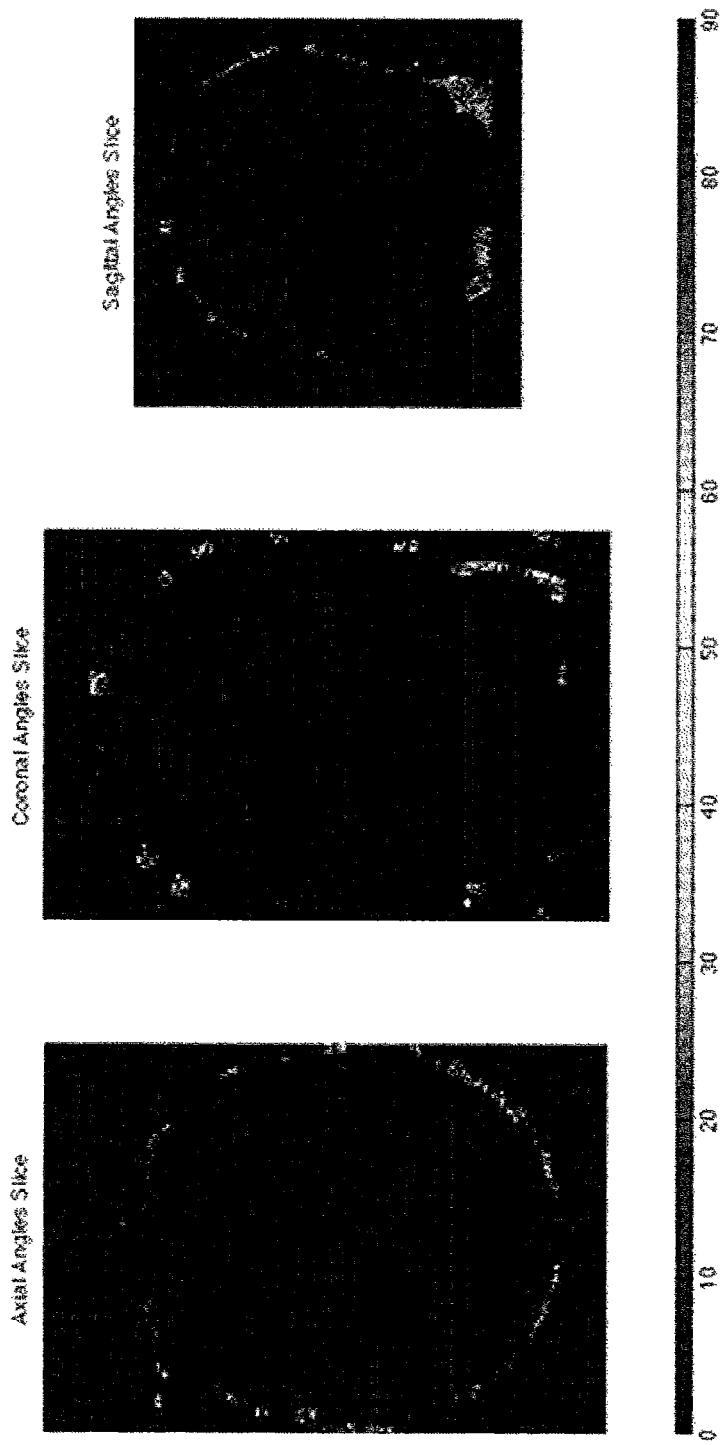
FIG. 12 comprises mid-axial, mid-coronal and mid-sagittal images of the differences between the edge angle and those of the angle maps.
Figure 13:
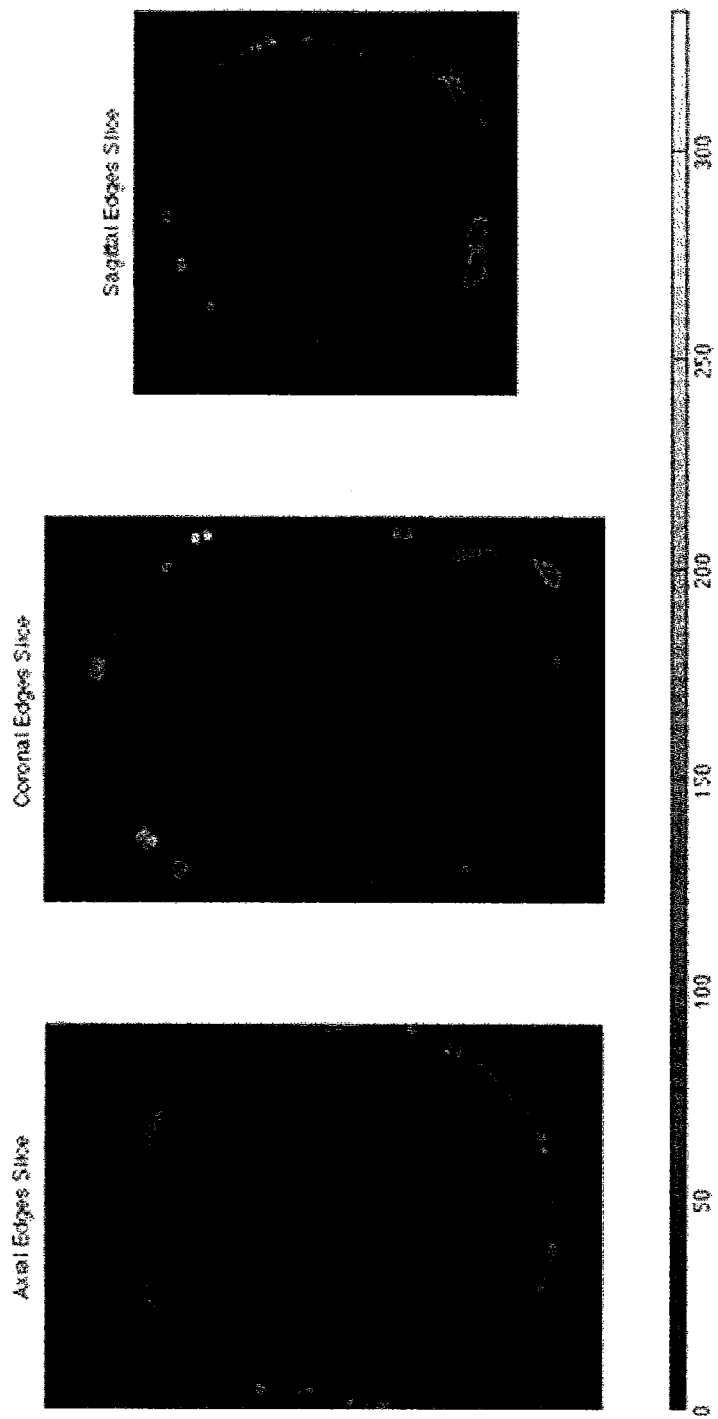
FIG. 13 comprises the Extracted Image Edges in the mid-axial, mid-coronal and mid-sagittal views, wherein these images were created by thresholding the images from FIG. 12 and prior to filtering by bounding box edge length.
Figure 15:
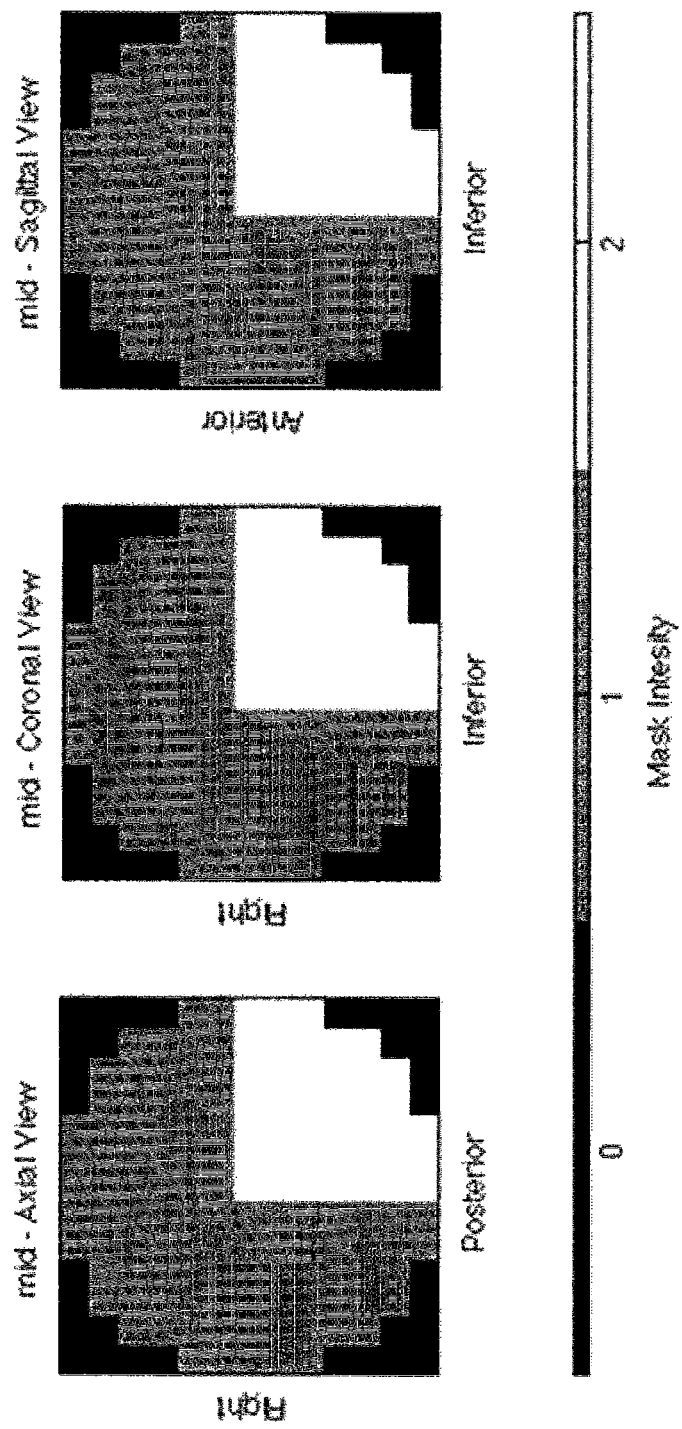
FIG. 15 comprises three examples of an Electrode Mask with Directionality.

The centroid locations of all remaining discrete objects in the TFS are calculated. These centroid locations correspond to centroid locations of the electrodes themselves. The centroids then are convolved with a mask matching the three dimensional rotation of a single electrode. The difference of this mask with the previous electrode mask is that, while the overall shape is similar, the intensities vary by direction using the directions established previously. See FIG. 15. While not necessary, the directionality imposed on this mask improves the registration speed and accuracy. This generates a three dimensional image of electrodes that contains orientation information. These electrodes can then be registered to another 3D image of the electrodes whose channel numbers are known, imparting the channel ID to the electrode locations of the original image. See FIG. 9.

An optional operation is the elimination of edges in the shell by edge angle. This process compares the angles at which edges are oriented to a radial map of edges. This map's origin can be placed at the image center or the center of mass of the image. Because the electrodes protrude from the skull, their edges mainly have radial components. The scalp, on the other hand, does not; rather, its components are mainly tangential and thus the two objects can be separated. This method can be applied on its own in combination with the above method to extract the electrodes for registration. See FIGS. 10-13.

Modifications and Improvements

Various modifications and improvements are available to the disclosure, including:

Code optimization for speed,

Improve robustness of artifact rejection,

Optimize prospective data collection (EEG electrodes, MRI scanning parameters),

Integrate with available EEG source localization packages.

CONCLUSION

The foregoing description of one or more embodiments of the disclosure has been presented for the purposes of illustration and description. It is not intended to be exhaustive or to limit the disclosure to the precise form disclosed. Many modifications and variations are possible in light of the above teaching. It is intended that the scope of the disclosure be limited not by this detailed description, but rather by the claims appended hereto.

What is claimed is:

1. A method for identifying electrode locations for electroencephalography (EEG) from three-dimensional head images, comprising:
   automatically identifying precise locations of a plurality of EEG electrodes positioned on a patient's head from three dimensional images stored in an electronic format,
   wherein the images are derived from a single imaging modality that render the electrodes visible;
   wherein the automatically identifying precise locations comprises
      using object shapes and properties intrinsic to the EEG electrodes to locate the electrodes in the three dimensional images without use of exogenous markers, and
      calculating centroid locations of each of the located plurality of EEG electrodes; and
   generating a three dimensional image as a function of the identified precise locations of the plurality of EEG electrodes;
   wherein the three dimensional image comprises
      a reconstruction of the located plurality of EEG electrodes and
      orientation information;
   wherein the single imaging modality consists of magnetic resonance imaging (MRI);
   wherein the orientation information is acquired by:
      convolving the calculated centroid locations with a mask matching a three dimensional rotation of a single electrode.

2. The method of claim 1, wherein the three dimensional images show the brain in detail, the method further comprising:
   using the precise electrode locations to establish a relationship of the electrodes to the brain; and
   identifying electrical sources within the brain that create EEG signals.

3. The method of claim 1, wherein the precise electrode locations are identified without the use of markers to allow for direct detection of the electrodes, eliminating the need to estimate electrode location from marker location.

4. The method of claim 1, further comprising:
   registering the plurality of EEG electrodes to a second three dimensional image of the plurality of EEG electrodes whose channel numbers are known; and
   imparting a channel ID to the electrode locations of the three dimensional image.

5. A method for identifying electrode locations for electroencephalography (EEG) from three-dimensional head images, comprising:
   inputting three dimensional images stored in an electronic format,
   wherein the images are derived from a single imaging modality;
   executing, via a processor, instructions software encoded on a computer readable medium for:
      automatically identifying precise locations of a plurality of EEG electrodes positioned on a patient's head solely from the inputted three dimensional images;
      wherein the automatically identifying precise locations comprises
         using object shapes and properties intrinsic to the EEG electrodes to locate the electrodes in the three dimensional images without use of exogenous markers, and
         calculating centroid locations of each of the located plurality of EEG electrodes;
   and
   generating a three dimensional image as a function of the identified precise locations of the plurality of EEG electrodes;
   wherein the three dimensional image comprises
      a reconstruction of the plurality of located EEG electrodes and
      orientation information;
   wherein the single imaging modality consists of magnetic resonance imaging (MRI);
   wherein the orientation information is acquired by:
      convolving the calculated centroid locations with a mask matching a three dimensional rotation of a single electrode.

6. The method of claim 5, wherein the three dimensional images show the brain in detail, the method further comprising:
   using the precise electrode locations to establish a relationship of the electrodes to the brain; and
   identifying electrical sources within the brain that create EEG signals.

7. The method of claim 5, wherein the precise electrode locations are identified without the use of markers to allow for direct detection of the electrodes, eliminating the need to estimate electrode location from marker location.

8. The method of claim 5, further comprising:
   registering the plurality of EEG electrodes to a second three dimensional image of the plurality of EEG electrodes whose channel numbers are known; and
   imparting a channel ID to the electrode locations of the three dimensional image.

9. A method for identifying electrode locations for electroencephalography (EEG) from three-dimensional head images, comprising:
   automatically identifying precise locations of a plurality of EEG electrodes positioned on a patient's head from three dimensional images stored in an electronic format,
   wherein the images are derived from a single imaging modality that render the electrodes visible;
   wherein the automatically identifying precise locations comprises
      using object shapes and properties intrinsic to the EEG electrodes to locate the electrodes in the three dimensional images, and
      calculating centroid locations of each of the located plurality of EEG electrodes;
   wherein the single imaging modality comprises magnetic resonance imaging (MRI);
   generating a three dimensional image comprising
      orientation information of the plurality of located EEG electrodes;
   wherein the orientation information of the plurality of located electrodes is acquired by:
      convolving the calculated centroid locations with a mask matching a three dimensional rotation of a single electrode.

10. A method for identifying electrode locations for electroencephalography (EEG) from three-dimensional head images, comprising:

inputting three dimensional images stored in an electronic format,
   wherein the images are derived from a single imaging modality;
executing, via a processor, instructions software encoded on a computer readable medium for:
automatically identifying precise locations of a plurality of EEG electrodes positioned on a patient's head solely from the inputted three dimensional images;
wherein the automatically identifying precise locations comprises
   using object shapes and properties intrinsic to the EEG electrodes to locate the electrodes in the three dimensional images, and
   calculating centroid locations of each of the plurality of located EEG electrodes;
wherein the single imaging modality comprises magnetic resonance imaging (MRI);
generating a three dimensional image comprising
   orientation information of the plurality of located EEG electrodes;
wherein the orientation information of the plurality of electrodes is acquired by:
   convolving the calculated centroid locations with a mask matching a three dimensional rotation of a single electrode.

* * * * *